(12) United States Patent
Zheng et al.

(10) Patent No.: US 12,260,595 B2
(45) Date of Patent: Mar. 25, 2025

(54) MULTI-MODE THREE-DIMENSIONAL SCANNING METHOD AND SYSTEM

(71) Applicant: SCANTECH (HANGZHOU) CO., LTD., Hangzhou (CN)

(72) Inventors: Jun Zheng, Hangzhou (CN); Shangjian Chen, Hangzhou (CN); Jiangfeng Wang, Hangzhou (CN); Lidan Zhang, Hangzhou (CN)

(73) Assignee: SCANTECH (HANGZHOU) CO., LTD., Hangzhou (CN)

( * ) Notice: Subject to any disclaimer, the term of this patent is extended or adjusted under 35 U.S.C. 154(b) by 330 days.

(21) Appl. No.: 17/757,695

(22) PCT Filed: Dec. 17, 2020

(86) PCT No.: PCT/CN2020/137221
§ 371 (c)(1),
(2) Date: Jun. 17, 2022

(87) PCT Pub. No.: WO2021/121320
PCT Pub. Date: Jun. 24, 2021

(65) Prior Publication Data
US 2022/0383549 A1 Dec. 1, 2022

(30) Foreign Application Priority Data
Dec. 17, 2019 (CN) .......................... 201911301536.6

(51) Int. Cl.
*G06T 7/521* (2017.01)
*G01B 11/00* (2006.01)
(Continued)

(52) U.S. Cl.
CPC .............. *G06T 7/85* (2017.01); *G01B 11/002* (2013.01); *G01B 11/2513* (2013.01);
(Continued)

(58) Field of Classification Search
CPC .............. G01B 11/002; G01B 11/2513; G06T 15/04; G06T 2207/10028; G06T 7/85;
(Continued)

(56) References Cited

U.S. PATENT DOCUMENTS 10,810,750 B1 * 10/2020 Wang ...................... G06T 7/593
2015/0070468 A1   3/2015 Pfeffer
(Continued)

FOREIGN PATENT DOCUMENTS

CN         106500627 A      3/2017
CN         106500628 A      3/2017
(Continued)

OTHER PUBLICATIONS

International Search Report issued in International Application No. PCT/CN2020/137221 dated Mar. 16, 2021 (2 pages).
Written Opinion issued in International Application No. PCT/CN2020/137221 dated Mar. 16, 2021 (5 pages).

*Primary Examiner* — Ian L Lemieux
(74) *Attorney, Agent, or Firm* — Osha Bergman Watanabe & Burton LLP

(57) ABSTRACT

A multi-mode three-dimensional scanning method includes: obtaining intrinsic parameters and extrinsic parameters of a calibrated camera in different scanning modes, and upon switching between the different scanning modes, triggering a change of parameters of the camera to the intrinsic parameters and the extrinsic parameters in a corresponding scanning mode; and a user selecting to execute a laser-based scanning mode, a speckle-based scanning mode or a transition scanning mode according to a scanning requirement. In the continual fusion and conversion during the whole scanning process, the speckle reconstruction and the laser line reconstruction are unified to the same coordinate system, and the surface point cloud of the object being scanned (Continued)

is output. The present disclosure also provides a multi-mode three-dimensional scanning system.

9 Claims, 3 Drawing Sheets

(51) Int. Cl.
G01B 11/25 (2006.01)
G06T 7/80 (2017.01)
G06T 15/04 (2011.01)
G06T 7/30 (2017.01)

(52) U.S. Cl.
CPC .............. *G06T 7/521* (2017.01); *G06T 15/04* (2013.01); *G06T 7/30* (2017.01); *G06T 2207/10028* (2013.01)

(58) Field of Classification Search
CPC ........... G06T 2207/10024; G06T 2207/10048; G06T 7/521
See application file for complete search history.

(56) References Cited

U.S. PATENT DOCUMENTS

| | | | |
|---|---|---|---|
| 2017/0018094 A1* | 1/2017 | Todeschini | G01B 11/022 |
| 2019/0242697 A1* | 8/2019 | Zheng | G01B 11/254 |
| 2019/0273906 A1* | 9/2019 | Xiao | H01S 5/04256 |

FOREIGN PATENT DOCUMENTS

| | | |
|---|---|---|
| CN | 106568394 A | 4/2017 |
| CN | 106595528 A | 4/2017 |
| CN | 106802138 A | 6/2017 |
| CN | 208140024 U | 11/2018 |
| CN | 208239783 U | 12/2018 |
| CN | 110030946 A | 7/2019 |
| CN | 209445995 U | 9/2019 |
| CN | 111023970 A | 4/2020 |
| CN | 108362228 B | 10/2020 |
| EP | 0352952 A2 | 1/1990 |
| WO | 2017173744 A1 | 10/2017 |

* cited by examiner

MULTI-MODE THREE-DIMENSIONAL SCANNING METHOD AND SYSTEM

CROSS-REFERENCE TO RELATED APPLICATIONS

The present application claims the priority from Chinese Patent Application No. 201911301536.6, entitled "MULTI-MODE THREE-DIMENSIONAL SCANNING METHOD AND SYSTEM" filed on Dec. 17, 2019, which is incorporated herein by reference in its entirety.

TECHNICAL FIELD

The present application relates to the field of three-dimensional (3D) scanning technology, in particular to a multi-mode 3D scanning method and system.

BACKGROUND

In recent years, the 3D scanning industry has developed rapidly, and handheld laser scanners, handheld photographic scanners, fixed photographic scanners, and various other laser 3D reconstruction and measurement devices have emerged. The structures of the above-mentioned devices mostly adopt a combination of an optical projection device and an industrial camera, and 3D surface information of a measured object is obtained according to a 3D reconstruction principle. Among them, handheld scanners are widely used in industries such as automobile, aviation, ship, cultural relic protection, and medical treatment due to their portability.

In the 3D reconstruction based on laser light and an industrial camera, laser light with different wavebands have different effects on the 3D reconstruction. In the related art, a handheld laser scanner usually uses red laser light or blue laser light in combination to realize different scanning effects. In the above laser scanning process, it is necessary to paste markers in a scanning scene. Each frame of reconstructed point cloud is unified in the same coordinate system by stitching of the markers. Then a complete surface information of the scanned object is obtained by a marker repairing algorithm. However, in some scanning scenes, firstly, the object being scanned is not allowed to be pasted with markers; secondly, the surface information of the object being scanned cannot be truly restored due to the fact that loss of details often occurs during the marker repairing process, so that it cannot be applied to application fields which cannot be directly reconstructed by using markers, such as precious cultural relic reconstruction and the like. The existing photographic scanners usually use speckle projection devices instead of markers to reconstruct a complete 3D surface. However, in the speckle projection method, due to the low reconstruction accuracy of speckles and the low stitching accuracy of 3D point cloud features, a high-accuracy reconstructed surface cannot be obtained, and it cannot be well applied to the industrial field with high-accuracy requirements.

Currently, no effective solution has been proposed for the problems of limited use scenes, complicated process of scanning objects in different scenes, and high cost of the handheld scanner in the related art.

SUMMARY

According to various embodiments of the present application, a multi-mode three-dimensional scanning method is provided. The method includes the following steps:

obtaining intrinsic parameters and extrinsic parameters of a calibrated camera in different scanning modes, and upon switching between the scanning modes, triggering a change of the parameters of the camera to the intrinsic parameters and the extrinsic parameters in the corresponding scanning mode;

selecting and executing, according to a scanning requirement, the corresponding scanning mode:

a laser-based scanning mode: performing laser projection, obtaining an image of 2D laser lines and markers, extracting information of the 2D laser lines and markers, reconstructing a three-dimensional laser line point cloud and markers by using a trigonometry or epipolar principle, and obtaining a conversion relationship between point clouds of a previous frame and of a subsequent frame according to matching information of the existing markers, so as to obtain a surface point cloud of an object being scanned in a same coordinate system;

a speckle-based scanning mode: performing speckle projection, obtaining a 2D speckle image and extracting information of the 2D speckle image, reconstructing a three-dimensional area array point cloud by using a template matching principle, and obtaining a conversion relationship between point clouds of a current frame and of a previous frame according to information of feature points of the existing point clouds, so as to obtain a surface point cloud of the object being scanned in a same coordinate system.

In one or more embodiments, selecting and executing, according to a scanning requirement, the corresponding scanning mode further includes:

a transition scanning mode from the laser-based scanning mode to the speckle-based scanning mode: first using the laser-based scanning mode to obtain an image of 2D laser lines, reconstructing three-dimensional laser lines and markers, and obtaining a three-dimensional laser line point cloud according to a marker-based conversion relationship, then switching to the speckle-based scanning mode, reconstructing a three-dimensional area array point cloud based on a speckle image, matching features of the current three-dimensional area array point cloud according to features of the existing three-dimensional laser line point cloud to obtain a point cloud conversion relationship, and converting the current point cloud to the existing coordinate system according to the point cloud conversion relationship.

In one or more embodiments, selecting and executing, according to scanning a requirement, the corresponding scanning mode further includes:

a transition scanning mode from the laser-based scanning mode to the speckle-based scanning mode: first using the laser-based scanning mode to obtain an image of 2D laser lines, reconstructing three-dimensional laser lines and markers, and obtaining a three-dimensional laser line point cloud according to a marker-based conversion relationship, then switching to the speckle-based scanning mode, reconstructing at least three markers in a field of view from the laser-based scanning mode, matching markers of a current frame according to the existing markers to obtain a point cloud conversion relationship, and converting the current point cloud to the existing coordinate system according to the point cloud conversion relationship.

In one or more embodiments, selecting and executing, according to a scanning requirement, the corresponding scanning mode further includes:

a transition scanning mode from the speckle-based scanning mode to the laser-based scanning mode: first using the speckle-based scanning mode to reconstruct an area array point cloud and a set of markers, then switching to the laser-based scanning mode, reconstructing at least three markers in a field of view from the speckle-based scanning mode, matching features of the markers reconstructed in the laser-based scanning mode after switching according to features of the existing markers reconstructed in the speckle-based scanning mode to obtain a point cloud conversion relationship, and converting the current point cloud to the existing coordinate system according to the point cloud conversion relationship.

In the above embodiments, fusion and conversion are continually performed in the whole scanning process, the speckle-based reconstruction and the laser line-based reconstruction are unified to the same coordinate system, and the surface point cloud of the object being scanned is finally output.

According to various embodiments of the present application, a multi-mode 3D scanning system is further provided. The system includes at least one laser projector, at least one speckle projector, at least two cameras with known relative positions, and a computing processor. The system further includes a synchronous trigger which is connected to the at least one laser projector, the at least one speckle projector, and the at least two cameras with known relative positions, respectively, and synchronously triggers the projector corresponding to the current working mode and the cameras;

the computing processor obtains the intrinsic parameters and the extrinsic parameters of the calibrated camera in different scanning modes, and upon switching between the scanning modes, synchronously triggers a change of the parameters of the camera to the intrinsic parameters and the extrinsic parameters in the corresponding scanning mode; selects and executes, according to a scanning requirement, the corresponding scanning mode:

a laser-based scanning mode: performing laser projection, obtaining an image of 2D laser lines and markers, extracting information of the 2D laser lines and markers, reconstructing a three-dimensional laser line point cloud and markers by using a trigonometry or epipolar principle, and obtaining a conversion relationship between point clouds of a previous frame and of a subsequent frame according to matching information of the existing markers, so as to obtain a surface point cloud of an object being scanned in a same coordinate system;

a speckle-based scanning mode: performing speckle projection, obtaining a 2D speckle image and extracting information of the 2D speckle image, reconstructing a three-dimensional area array point cloud by using a template matching principle, and obtaining a conversion relationship between point clouds of a current frame and of a previous frame according to information of feature points of the existing point clouds, so as to obtain a surface point cloud of the object being scanned in a same coordinate system.

In one or more embodiments, the system further includes bandpass filters configured on the at least two cameras with known relative positions. Bandpass wavebands of the bandpass filters correspond to a waveband of the at least one laser projector and a waveband of the at least one speckle projector, respectively.

In one or more embodiments, the at least one lase projector and the at least one speckle projector are a combination of a red light projector and an infrared vertical-cavity surface-emitting laser (VCSEL) projector, a combination of a blue light projector and an infrared VCSEL projector, or a combination of a red light projector, a blue light projector, and an infrared VCSEL projector.

In one or more embodiments, the system further includes a texture camera for obtaining texture information of the object being scanned. The synchronous trigger is connected to the texture camera, which is connected to a texture mapper. A scan model is obtained by the texture mapper in conjunction with the computing processor.

In one or more embodiments, lenses of the at least two cameras with known relative positions are two industrial cameras, or two industrial cameras and a color texture camera.

In one or more embodiments, the computing processor includes:

a 2D image processor for obtaining 2D image data from the cameras and performing extraction;

a parameter synchronous switching determiner for selecting the corresponding intrinsic parameters and the extrinsic parameters of the calibrated camera according to different scanning modes;

a 3D data reconstructor for selecting the corresponding camera parameters and different reconstruction modes according to the selected scanning mode, and computing the conversion from the 2D images of each pair of frames of the two cameras to the 3D point cloud by using the output data of the 2D image processor, so as to obtain the 3D point cloud;

and a 3D data converter for converting the 3D point cloud of the current frame from a local coordinate system to a global coordinate system through feature stitching of the point cloud or the markers.

The above-described multi-mode three-dimensional scanning method and system have the following advantages: applicability in a variety of scanning scenes, increase in the reusability of a single scanner, reduction in the use cost, and cost-effectiveness.

BRIEF DESCRIPTION OF DRAWINGS

In order to better describe and illustrate embodiments and/or examples of those applications disclosed herein, reference may be made to one or more of the accompanying drawings. The additional details or examples used to describe the drawings should not be understood to limit the scope of any of the disclosed applications, the presently described embodiments and/or examples, and the best mode presently understood of these applications.

Figure 1:
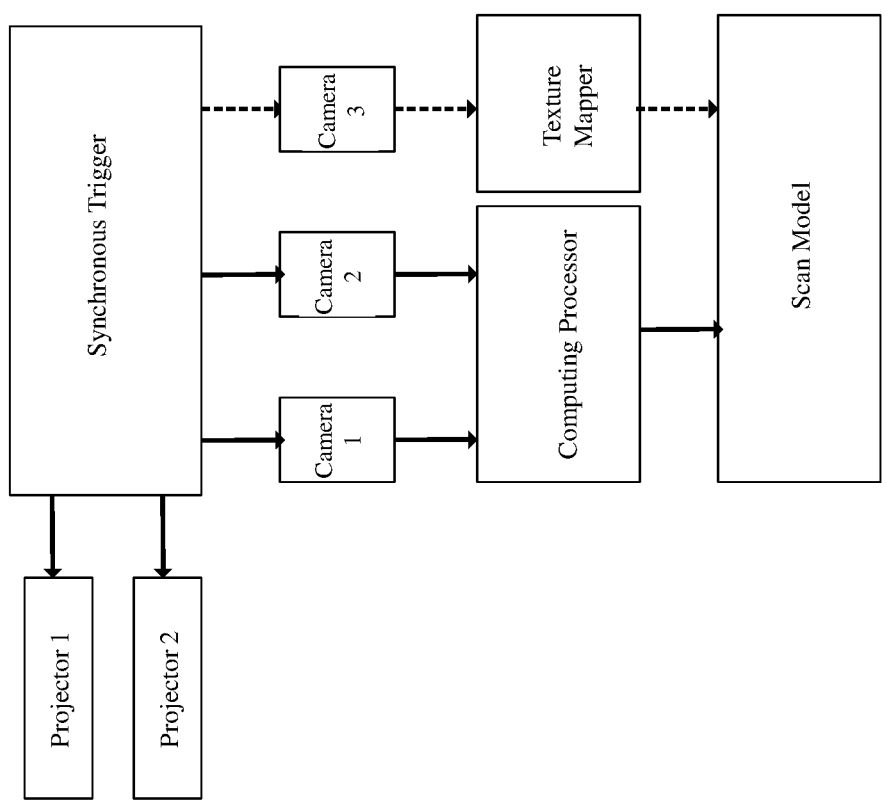
FIG. 1 is a schematic diagram of a multi-mode three-dimensional scanning method and device according to one or more embodiments of the present application.

In the drawings: 1. object being scanned, 2. schematic diagram of laser lines, 3. schematic diagram of speckle projection, 4. marker, 5. processing terminal, and 22. multi-mode three-dimensional scanning device.

DETAILED DESCRIPTION

In order to make the objectives, technical solutions, and advantages of the present application clearer, the present application is further described in detail below with reference to the accompanying drawings and embodiments. It should be understood that the specific embodiments described herein are only used to explain the present application and are not used to limit the present application. Based on the examples in the present application, all other examples obtained by one of ordinary skill in the art without any creative effort shall fall within the scope of protection of the present application.

Obviously, the accompanying drawings in the following description are only some examples or embodiments of the present application. For one of ordinary skill in the art, the present application can also be applied to other similar situations according to these drawings without any creative effort. In addition, it is also understandable that although the efforts made in this development process may be complicated and lengthy, some design, manufacturing, or production changes made based on the technical content disclosed in the present application are just conventional technical means for one of ordinary skill in the art related to the content disclosed in the present application, and should not be understood to indicate an inadequate disclosure of the present application.

The "embodiment(s)" mentioned in the present application means that specific features, structures, or characteristics described in conjunction with the embodiment(s) may be included in at least one embodiment of the present application. This phrase appearing in various places of the description does not necessarily refer to the same embodiment, nor does it mean an independent or alternative embodiment mutually exclusive with other embodiments. One of ordinary skill in the art explicitly and implicitly understands that the embodiments described herein can be combined with other embodiments.

Unless otherwise defined, the technical terms or scientific terms used in the claims and the specification shall have the ordinary meanings understood by one with general skills in the technical field to which the present application pertains. The terms such as "a," "an," "one," and "the" used in the specification and the claims of the present application do not indicate a quantitative limit and may indicate a singular or plural number. The terms "include," "comprise," and the like mean that the element or item appearing before "include" or "comprise" covers the element or item listed after "include" or "comprise" and their equivalents, without excluding other elements or items. The terms "connected," "linked," and the like are not limited to physical or mechanical connections, but may include electrical connections, whether direct or indirect. The term "plurality" used in the specification and the claims of the present application means equal to or more than two. The term "and/or" describes a relationship of associated objects, indicating three relationships. For example, A and/or B may indicate that A exists alone, A and B exist at the same time, or B exists alone. The character "/" generally indicates that the associated objects are in an "or" relationship.

Figure 2:
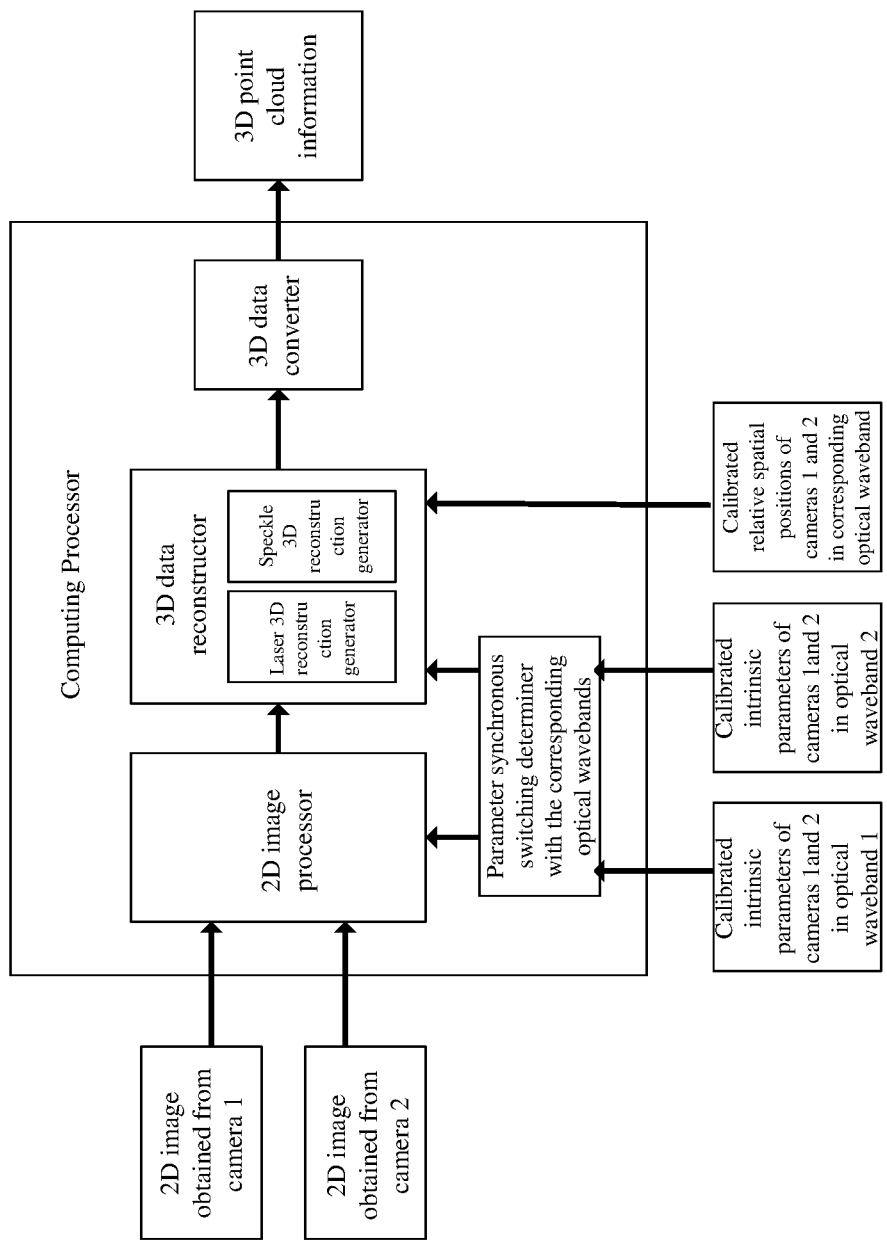
FIG. 2 is a schematic diagram of a computing processor for three-dimensional reconstruction according to one or more embodiments of the present application.
Figure 3:
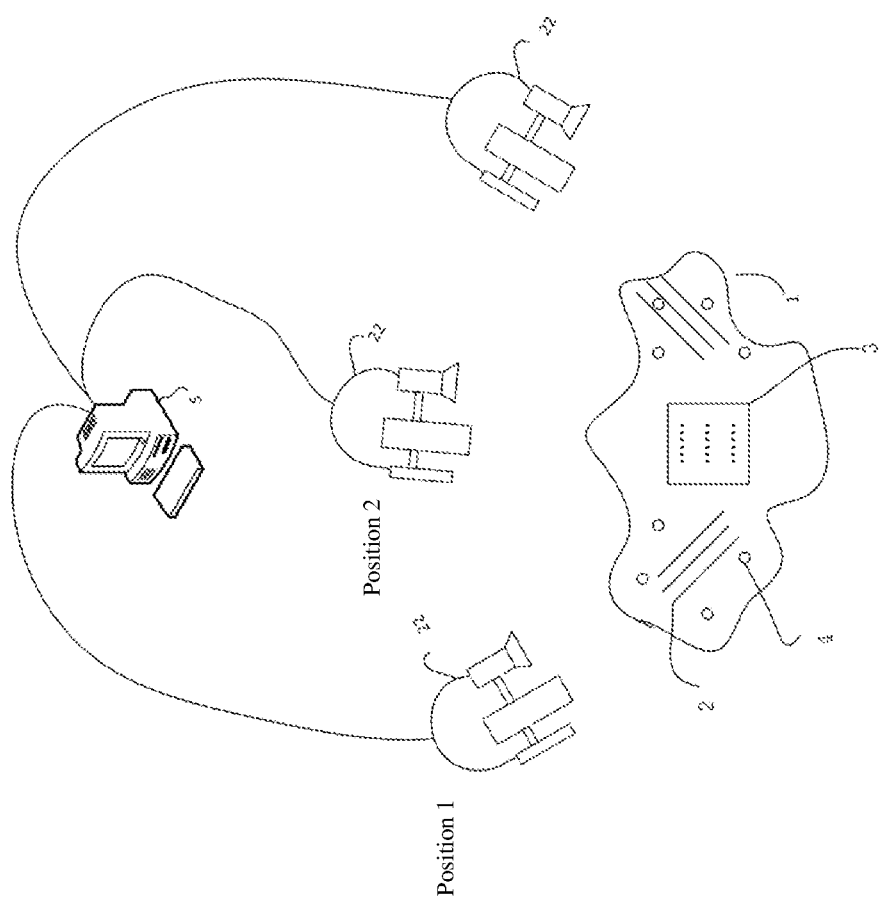
FIG. 3 is a schematic diagram of a transition scanning mode according to one or more embodiments of the present application.

Referring to FIGS. 1-3, a multi-mode three-dimensional scanning method includes the following steps:

S1, obtaining intrinsic parameters and extrinsic parameters of a calibrated camera in different scanning modes, and upon switching between the scanning modes, triggering a change of the parameters of the camera to the intrinsic parameters and the extrinsic parameters in the corresponding scanning mode.

S2, selecting and executing, according to a scanning requirement, the corresponding scanning mode:

S21, a laser-based scanning mode: performing laser projection, obtaining an image of 2D laser lines and markers, extracting information of the 2D laser lines and markers, reconstructing a three-dimensional laser line point cloud and markers by using a trigonometry or epipolar principle, and obtaining a conversion relationship between point clouds of a previous frame and of a subsequent frame according to matching information of the existing markers, so as to obtain a surface point cloud of an object being scanned in a same coordinate system;

S22, a speckle-based scanning mode: performing speckle projection, obtaining a 2D speckle image and extracting information of the 2D speckle image, reconstructing a three-dimensional area array point cloud by using a template matching principle, and obtaining a conversion relationship between point clouds of a current frame and of a previous frame according to information of feature points of the existing point clouds, so as to obtain a surface point cloud of the object being scanned in a same coordinate system;

S23, a transition scanning mode from the laser-based scanning mode to the speckle-based scanning mode: first using the laser-based scanning mode to obtain an image of 2D laser lines, reconstructing three-dimensional laser lines and markers, and obtaining a three-dimensional laser line point cloud according to a marker-based conversion relationship, then switching to the speckle-based scanning mode, reconstructing a three-dimensional area array point cloud based on a speckle image, matching features of the current three-dimensional area array point cloud according to features of the existing three-dimensional laser line point cloud to obtain a point cloud conversion relationship, and converting the current point cloud to the existing coordinate system according to the current point cloud conversion relationship;

S24, a transition scanning mode from the laser-based scanning mode to the speckle-based scanning mode: first using the laser-based scanning mode to obtain an image of 2D laser lines, reconstructing three-dimensional laser lines and markers, and obtaining a three-dimensional laser line point cloud according to a marker-based conversion relationship, then switching to the speckle-based scanning mode, reconstructing at least three markers in a field of view from the laser-based scanning mode, matching markers of a current frame according to the existing markers to obtain a point cloud conversion relationship, and converting the current point cloud to the existing coordinate system according to the current point cloud conversion relationship;

S25, a transition scanning mode from the speckle-based scanning mode to the laser-based scanning mode: first using the speckle-based scanning mode to reconstruct an area array point cloud and a set of markers, then switching to the laser-based scanning mode, reconstructing at least three markers in a field of view from the speckle-based scanning mode, matching features of the markers reconstructed in the laser-based scanning mode after switching according to features of the existing markers reconstructed in the speckle-based scanning mode to obtain a point cloud conversion relationship, and converting the current point cloud to the existing coordinate system according to the current point cloud conversion relationship.

In the above steps, fusion and conversion are continually performed in the whole scanning process, the speckle-based reconstruction and the laser line-based reconstruction are unified to the same coordinate system, and the surface point cloud of the object being scanned is finally output.

A multi-mode three-dimensional scanning system includes at least one laser projector, at least one speckle projector, at least two cameras with known relative positions, and a computing processor, and further includes a synchronous trigger which is connected to the at least one laser projector, the at least one speckle projector, and the at least two cameras with known relative positions, respectively, and synchronously triggers the projector corresponding to the current working mode and the cameras;

the computing processor obtains the intrinsic parameters and the extrinsic parameters of the calibrated camera in different scanning modes, and upon switching between the scanning modes, triggers a change of the parameters of the camera to the intrinsic parameters and the extrinsic parameters in the corresponding scanning mode; selects and executes, according to a scanning requirement, the corresponding scanning mode:

a laser-based scanning mode: performing laser projection, obtaining an image of 2D laser lines and markers, extracting information of the 2D laser lines and markers, reconstructing a three-dimensional laser line point cloud and markers by using a trigonometry or epipolar principle, and obtaining a conversion relationship between point clouds of a previous frame and of a subsequent frame according to matching information of the existing markers, so as to obtain a surface point cloud of an object being scanned in a same coordinate system;

a speckle-based scanning mode: performing speckle projection, obtaining a 2D speckle image and extracting information of the 2D speckle image, reconstructing a three-dimensional area array point cloud by using a template matching principle, and obtaining a conversion relationship between point clouds of a current frame and of a previous frame according to information of feature points of the existing point clouds, so as to obtain a surface point cloud of the object being scanned in a same coordinate system.

In one or more embodiments, the system further includes bandpass filters configured on the at least two cameras with known relative positions, and bandpass wavebands thereof correspond to a waveband of the at least one laser projector and a waveband of the at least one speckle projector, respectively.

In one or more embodiments, the at least one lase projector and the at least one speckle projector in the system are a combination of a red light projector and an infrared VCSEL projector, a combination of a blue light projector and an infrared VCSEL projector, or a combination of a red light projector, a blue light projector, and an infrared VCSEL projector.

In one or more embodiments, the system further includes a texture camera for obtaining texture information of the object being scanned. The synchronous trigger is connected to the texture camera, which is connected to a texture mapper. A scan model is obtained by the texture mapper in conjunction with the computing processor.

In one or more embodiments, lenses of the at least two cameras with known relative positions in the system are two industrial cameras, or two industrial cameras and a color texture camera.

In one or more embodiments, the computing processor in the system includes:

a 2D image processor for obtaining 2D image data from the cameras and performing extraction;

a parameter synchronous switching determiner for selecting the corresponding intrinsic parameters and the extrinsic parameters of the calibrated camera according to different scanning modes;

a 3D data reconstructor for selecting the corresponding camera parameters and different reconstruction modes according to the selected scanning mode, and computing the conversion from the 2D images of each pair of frames of the two cameras to the 3D point cloud by using the output data of the 2D image processor to obtain the 3D point cloud; and a 3D data converter for converting the 3D point cloud of the current frame from a local coordinate system to a global coordinate system through feature stitching of the point cloud or the markers.

Taking the transition scanning mode S22 for example, the illustration is as follows:

FIG. 1 is a schematic diagram of a multi-mode device, which includes: laser projectors of two wavebands that provide 650 nm red laser lines and 940 nm infrared speckle projection, respectively; a synchronous trigger which is connected to the two laser projectors and synchronously triggers one laser projector in the current working waveband; two cameras with known relative positions that are provided with multi-bandpass filters, the bandpass wavebands of which correspond to the wavebands of the two laser projectors, and a texture camera may be added to obtain the texture information of the object being scanned; and a computing processor for reconstruction from 2D to 3D. If a texture camera is added, a texture mapper is required, and finally a scan model is obtained.

FIG. 2 is a schematic diagram of a computing processor, which mainly includes a 2D image processor, a parameter synchronous switching determiner, a 3D data reconstructor, and a 3D data converter. The 2D image processor obtains 2D image data from the cameras and performs contour extraction. The parameter synchronous switching determiner selects the corresponding intrinsic parameters and distortion coefficients of the calibrated cameras according to different scanning modes. The 3D data reconstructor can select different reconstruction methods, for example, epipolar reconstruction of laser lines and template matching reconstruction of speckles, according to parameters of the cameras in conjunction with the relative spatial positions of the cameras corresponding to different optical wavebands, so as to obtain three-dimensional point cloud information. The 3D data converter computes a stitching conversion relationship for each frame of point cloud, in which there is a stitching conversion based on marker features and a stitching conversion based on point cloud features according to different scanning modes. Finally, the conversion result from 2D image to 3D point cloud is output.

Before scanning, the intrinsic parameters and the distortion coefficients of the cameras corresponding to the red laser line and the infrared speckle are calibrated respectively by using the Zhang Zhengyou calibration method, and the relative spatial position relationship of the two cameras is calibrated by using a stereo calibration method.

Before scanning, the intrinsic parameters and the distortion coefficients of the cameras corresponding to the red laser line and the infrared speckle are calibrated respectively by using the Zhang Zhengyou calibration method, and the relative spatial position relationship of the two cameras with the corresponding optical wavebands is calibrated by using a stereo calibration method.

Zhang Zhengyou calibration: $x = K \cdot [R|T] \cdot X$ x: coordinates of point P in the image coordinate system; K: intrinsic parameters of the camera; R|T: extrinsic parameters of the camera; X: coordinates of point P in the world coordinate system;

Stereo calibration: $\begin{cases} R = R_L \cdot R_R^{-1} \\ T = T_L - R_L R_R^{-1} T_R \end{cases}$ where, $R_L T_L$: extrinsic parameters of camera 1; $R_R T_R$: extrinsic parameters of camera 2;

In a scanning scene with fewer features, a red laser-based scanning mode is started, the synchronous trigger triggers the optical filters of the cameras with the corresponding wavebands to work, and the parameter synchronous switching determiner of the computing processor with the corresponding wavebands synchronously selects the intrinsic parameters and the distortion coefficients of the cameras for the corresponding wavebands.

2D laser line contour images and marker contour images are obtained from the two cameras and transmitted to the computing processor to reconstruct a three-dimensional laser line point cloud using the epipolar constraint principle. A stitching conversion RT of the point clouds of a previous frame and a subsequent frame is obtained according to a relationship of the 3D information of the reconstructed markers of the previous and subsequent frames, so as to obtain a surface point cloud of the object being scanned in the same coordinate system.

In a scanning scene with abundant features, an infrared speckle-based scanning mode is started, the synchronous trigger triggers the optical filters of the cameras with the corresponding wavebands to work, and the parameter synchronous switching determiner of the computing processor with the corresponding wavebands synchronously selects the intrinsic parameters and the distortion coefficients of the cameras for the corresponding wavebands.

2D speckle image data is obtained from the two cameras and transmitted to the computing processor to reconstruct a three-dimensional surface point cloud by using the template matching principle. Feature points in the point clouds of a previous frame and a subsequent frame is extracted by using the SIFT algorithm, and a stitching conversion relationship RT of the previous and subsequent frames is obtained by using the ICP algorithm, so as to obtain a surface point cloud of the object being scanned in the same coordinate system.

Because detail features cannot be well restored by marker repairing and some objects being scanned cannot be fully pasted with markers, the mixed scanning mode can solve this problem well. Firstly, the laser-based scanning mode is started, as exemplified by position 1 in FIG. 3. 3D point cloud information is obtained by continual reconstruction according to the above laser-based reconstruction mode. When stitching cannot be performed using information of the markers, the speckle-based scanning mode is started, as exemplified by position 2 in FIG. 3. The filters of the cameras with the corresponding bandpass wavebands are synchronously triggered. The parameter synchronous switching determiner with the corresponding wavebands in the computing processor synchronously selects the intrinsic parameters and the distortion coefficients of the cameras for the corresponding wavebands. 3D point cloud information is obtained by applying the reconstruction method in the above speckle-based reconstruction mode. The stitching conversion relationship for converting the point cloud obtained by the laser scanning reconstruction to the global coordinate system is R1T1, and the SIFT algorithm is used to extract the feature points of the point cloud. The SIFT algorithm is used to extract the feature points of point cloud P obtained by the current speckle-based reconstruction. In particular, the one current speckle-reconstructed point cloud needs to overlap the previously scanned point cloud. Then the RANSAC and ICP algorithms are used to match the scanned laser-reconstructed point cloud with the current speckle-reconstructed point cloud to seek the conversion relationship R2T2 therebetween, namely: $P1=R2*P+T2$, further $P2=R1*P1+T1$, and finally $P2=R1*(R2*P+T)+T1$, to establish the conversion relationship for converting the speckle-projection-reconstructed point cloud to the global coordinate system. In particular, if it is needed to switch to the laser line-based scanning mode based on a prior reconstruction in the speckle-based scanning mode, it is necessary to reconstruct part of the marker information required for laser reconstruction in the previous frame of speckle scanning reconstruction, and then in the next frame of laser line reconstruction, stitching conversion is performed to convert to the same coordinate system according to the marker information. Finally, by unification to the same coordinate system, the complete surface point cloud of the object being scanned is obtained.

The various technical features of the above embodiments may be combined arbitrarily. For the purpose of simplicity in description, all possible combinations of the various technical features in the above embodiments are not described. However, as long as the combinations of these technical features do not represent contradictions, they shall be understood to fall within the scope of this specification.

The above-mentioned embodiments only describe several implementations of the present application. The descriptions thereof are specific and detailed but cannot thereby be construed as limitations to the patent scope of the present application. It should be noted that one of ordinary skill in the art may further make variations and improvements without departing from the concept of the present application, and these all fall within the protection scope of the present application. Therefore, the patent protection scope of the present application should be subject to the appended claims.

The invention claimed is:

1. A multi-mode three-dimensional scanning method, comprising:
    obtaining intrinsic parameters and extrinsic parameters of a calibrated camera in different scanning modes, and upon switching between the different scanning modes, triggering a change of parameters of the camera to the intrinsic parameters and the extrinsic parameters in a corresponding scanning mode;
    selecting and executing, according to a scanning requirement, the corresponding scanning mode that comprises:
    a laser-based scanning mode that comprises: performing a laser projection, obtaining an image of 2D laser lines and markers, extracting information of the 2D laser lines and markers, reconstructing a three-dimensional laser line point cloud and markers by using a trigonometry or epipolar principle, and obtaining a conversion relationship between point clouds of a previous frame and of a subsequent frame according to matching information of existing markers, so as to obtain a surface point cloud of an object being scanned in a same coordinate system;
    a speckle-based scanning mode that comprises: performing a speckle projection, obtaining a 2D speckle image and extracting information of the 2D speckle image, reconstructing a three-dimensional area array point cloud by using a template matching principle, and obtaining a conversion relationship between point clouds of a current frame and of a previous frame according to information of feature points of the existing point clouds, so as to obtain a surface point cloud of the object being scanned in a same coordinate system,
    wherein selecting and executing, according to a scanning requirement, the corresponding scanning mode further comprises:

a transition scanning mode from the laser-based scanning mode to the speckle-based scanning mode that comprises: first using the laser-based scanning mode to obtain an image of 2D laser lines, reconstructing three-dimensional laser lines and markers, and obtaining a three-dimensional laser line point cloud according to a marker-based conversion relationship, then switching to the speckle-based scanning mode, reconstructing a three-dimensional area array point cloud based on a speckle image, matching features of the current three-dimensional area array point cloud according to features of the existing three-dimensional laser line point cloud to obtain a point cloud conversion relationship, and converting the current point cloud to the existing coordinate system according to the point cloud conversion relationship.

2. The multi-mode three-dimensional scanning method according to claim 1, wherein
the transition scanning mode from the laser-based scanning mode to the speckle-based scanning mode further comprises: reconstructing at least three markers in a field of view from the laser-based scanning mode, matching markers of a current frame according to the existing markers reconstructed in the laser-based scanning mode to obtain a point cloud conversion relationship.

3. The multi-mode three-dimensional scanning method according to claim 1, wherein selecting and executing, according to scanning a requirement, the corresponding scanning mode further comprises:
a transition scanning mode from the speckle-based scanning mode to the laser-based scanning mode that comprises: first using the speckle-based scanning mode to reconstruct an area array point cloud and a set of markers, then switching to the laser-based scanning mode, reconstructing at least three markers in a field of view from the speckle-based scanning mode, matching features of the markers reconstructed in the laser-based scanning mode after switching according to features of the existing markers reconstructed in the speckle-based scanning mode to obtain a point cloud conversion relationship, and converting the current point cloud to the existing coordinate system according to the point cloud conversion relationship.

4. A multi-mode three-dimensional scanning system, comprising at least one laser projector, at least one speckle projector, at least two cameras with known relative positions, and a computing processor, the system further comprising:
a synchronous trigger that is connected to the at least one laser projector, the at least one speckle projector, and the at least two cameras with known relative positions, respectively, and synchronously triggers the projector corresponding to the current working mode and the cameras;
the computing processor that is used to obtain intrinsic parameters and extrinsic parameters of the calibrated cameras in different scanning modes, and upon switching between the scanning modes; triggers a change of parameters of the cameras to the intrinsic parameters and the extrinsic parameters in the corresponding scanning mode; and selects and executes, according to a scanning requirement, the corresponding scanning mode that comprises:
a laser-based scanning mode that comprises: performing a laser projection, obtaining an image of 2D laser lines and markers, extracting information of the 2D laser lines and markers, reconstructing a three-dimensional laser line point cloud and markers by using a trigonometry or epipolar principle, and obtaining a conversion relationship between point clouds of a previous frame and of a subsequent frame according to matching information of existing markers, so as to obtain a surface point cloud of an object being scanned in a same coordinate system; and
a speckle-based scanning mode that comprises: performing a speckle projection, obtaining a 2D speckle image and extracting information of the 2D speckle image, reconstructing a three-dimensional area array point cloud by using a template matching principle, and obtaining a conversion relationship between point clouds of a current frame and of a previous frame according to information of feature points of the existing point clouds, so as to obtain a surface point cloud of the object being scanned in a same coordinate system,
wherein selecting and executing, according to a scanning requirement, the corresponding scanning mode further comprises:
a transition scanning mode from the laser-based scanning mode to the speckle-based scanning mode that comprises: first using the laser-based scanning mode to obtain an image of 2D laser lines, reconstructing three-dimensional laser lines and markers, and obtaining a three-dimensional laser line point cloud according to a marker-based conversion relationship, then switching to the speckle-based scanning mode, reconstructing a three-dimensional area array point cloud based on a speckle image, matching features of the current three-dimensional area array point cloud according to features of the existing three-dimensional laser line point cloud to obtain a point cloud conversion relationship, and converting the current point cloud to the existing coordinate system according to the point cloud conversion relationship.

5. The multi-mode three-dimensional scanning system according to claim 4, further comprising bandpass filters configured on the at least two cameras with known relative positions, and bandpass wavebands of the bandpass filters correspond to a waveband of the at least one laser projector and a waveband of the at least one speckle projector, respectively.

6. The multi-mode three-dimensional scanning system according to claim 4, wherein the at least one laser projector and the at least one speckle projector are a combination of a red light projector and an infrared vertical-cavity surface-emitting laser (VCSEL) projector, a combination of a blue light projector and an infrared VCSEL projector, or a combination of a red light projector, a blue light projector, and an infrared VCSEL projector.

7. The multi-mode three-dimensional scanning system according to claim 4, further comprising a texture camera for obtaining texture information of the object being scanned, wherein the synchronous trigger is connected to the texture camera, the texture camera is connected to a texture mapper, and a scan model is obtained by the texture mapper in conjunction with the computing processor.

8. The multi-mode three-dimensional scanning system according to claim 4, wherein the at least two cameras with known relative positions are two industrial cameras, or two industrial cameras and a color texture camera.

9. The multi-mode three-dimensional scanning system according to claim 4, wherein the computing processor comprises:

a 2D image processor for obtaining 2D image data from the cameras and performing an extraction;

a parameter synchronous switching determiner for selecting the corresponding intrinsic parameters and the extrinsic parameters of the calibrated cameras according to different scanning modes;

a 3D data reconstructor for selecting the corresponding camera parameters and different reconstruction modes according to the selected scanning mode, and computing the conversion from the 2D images of each pair of frames of the two cameras to the 3D point cloud by using output data of the 2D image processor, so as to obtain the 3D point cloud; and a 3D data converter for converting the 3D point cloud of the current frame from a local coordinate system to a global coordinate system through feature stitching of the 3D point cloud or the markers.

* * * * *